(12) United States Patent
Jahnke et al.

(10) Patent No.: US 12,322,842 B2
(45) Date of Patent: Jun. 3, 2025

(54) SYSTEM AND METHOD FOR PRODUCING HYDROGEN USING HIGH TEMPERATURE FUEL CELLS

(71) Applicant: FuelCell Energy, Inc., Danbury, CT (US)

(72) Inventors: Fred C. Jahnke, Rye, NY (US); Matthew Lambrech, Sherman, CT (US)

(73) Assignee: FUELCELL ENERGY, INC., Danbury, CT (US)

( * ) Notice: Subject to any disclaimer, the term of this patent is extended or adjusted under 35 U.S.C. 154(b) by 0 days.

(21) Appl. No.: 18/648,712

(22) Filed: Apr. 29, 2024

(65) Prior Publication Data

US 2024/0282991 A1 Aug. 22, 2024

Related U.S. Application Data

(60) Division of application No. 17/824,630, filed on May 25, 2022, now Pat. No. 12,003,008, which is a (Continued)

(51) Int. Cl.
*H01M 8/0612* (2016.01)
*C01B 3/48* (2006.01)
(Continued)

(52) U.S. Cl.
CPC .............. *H01M 8/0618* (2013.01); *C01B 3/48* (2013.01); *C01B 3/52* (2013.01); *C01B 3/56* (2013.01);
(Continued)

(58) Field of Classification Search
CPC ... H01M 8/0618; H01M 8/04097; C01B 3/48; C01B 3/52; C01B 3/56;
(Continued)

(56) References Cited

U.S. PATENT DOCUMENTS 8,529,854 B2 9/2013 Find
2003/0190503 A1* 10/2003 Kumar ...................... C01B 3/48
423/652

(Continued)

FOREIGN PATENT DOCUMENTS

EP   1 205 433 A1   5/2002
EP   3 128 593 A1   2/2017
(Continued)

OTHER PUBLICATIONS

International Search Report and Written Opinion in PCT/US2019/048726 dated Nov. 8, 2019.
(Continued)

*Primary Examiner* — Matthew J Merkling
(74) *Attorney, Agent, or Firm* — Foley & Lardner LLP (57) ABSTRACT

A steam methane reformer-integrated fuel cell system includes at least one fuel cell including an anode, a cathode, and an electrolyte matrix. The system includes a steam methane reformer, a water-gas shift reactor, an absorber column, and a pressure swing adsorption (PSA) system. The PSA system is configured to purify the second product stream to output (1) a third product stream of the PSA system having a fourth concentration of hydrogen that is greater than the third concentration of hydrogen and (2) a PSA tail gas. The at least one fuel cell is configured to receive the PSA tail gas from the PSA system as an anode feed gas.

20 Claims, 3 Drawing Sheets

Related U.S. Application Data continuation of application No. 17/017,244, filed on Sep. 10, 2020, now Pat. No. 11,444,303, which is a continuation of application No. PCT/IB2019/052136, filed on Mar. 15, 2019.

(60) Provisional application No. 62/644,118, filed on Mar. 16, 2018.

(51) Int. Cl.
  *C01B 3/52* (2006.01)
  *C01B 3/56* (2006.01)
  *H01M 8/04089* (2016.01)

(52) U.S. Cl.
  CPC . *H01M 8/04097* (2013.01); *C01B 2203/0233* (2013.01); *C01B 2203/043* (2013.01); *C01B 2203/047* (2013.01); *C01B 2203/067* (2013.01); *C01B 2203/0827* (2013.01); *C01B 2203/1241* (2013.01)

(58) Field of Classification Search
  CPC ...... C01B 2203/0233; C01B 2203/043; C01B 2203/047; C01B 2203/067; C01B 2203/0827; C01B 2203/1241
  See application file for complete search history.

(56) References Cited

U.S. PATENT DOCUMENTS

| | | |
|---|---|---|
| 2004/0115492 A1 | 6/2004 | Galloway |
| 2009/0123791 A1 | 5/2009 | Takahashi et al. |
| 2010/0216039 A1 | 8/2010 | Jahnke et al. |
| 2012/0288439 A1 | 11/2012 | Sundaram et al. |
| 2013/0126038 A1 | 5/2013 | Jamal et al. |
| 2013/0247766 A1 | 9/2013 | Oppenheim et al. |
| 2016/0149233 A1 | 5/2016 | Jahnke et al. |
| 2016/0311682 A1 | 10/2016 | Turk et al. |
| 2017/0158504 A1 | 6/2017 | Merritt, Jr. |

FOREIGN PATENT DOCUMENTS

| | | |
|---|---|---|
| FR | 3052919 A1 | 12/2017 |
| JP | H1021945 A | 1/1998 |
| JP | 2013-045535 A | 3/2013 |
| KR | 101518726 B1 | 5/2015 |
| WO | WO-01/04046 A1 | 1/2001 |
| WO | WO-2005/012166 A1 | 2/2005 |
| WO | WO-2009/046721 A1 | 4/2009 |
| WO | WO-2013/144730 A2 | 10/2013 |
| WO | WO-2015/011566 A2 | 1/2015 |
| WO | WO-2017/189744 A1 | 11/2017 |

OTHER PUBLICATIONS

International Search Report and Written Opinion in PCT/IB2019/052136 dated Jun. 14, 2019.

\* cited by examiner

SYSTEM AND METHOD FOR PRODUCING HYDROGEN USING HIGH TEMPERATURE FUEL CELLS

CROSS-REFERENCE TO RELATED APPLICATION

The present application is a divisional of U.S. patent application Ser. No. 17/824,630, filed May 25, 2022, which is a continuation of U.S. patent application Ser. No. 17/017,244, filed Sep. 10, 2020, which is a bypass continuation of PCT/IB2019/052136, filed Mar. 15, 2019, which claims the benefit of and priority to U.S. Provisional Patent Application No. 62/644,118, filed Mar. 16, 2018. The entire disclosures of these applications are hereby incorporated by reference.

BACKGROUND

The present application relates to fuel cell systems and, in particular, to high temperature fuel cell systems integrated with a steam methane reformer (SMRs) for hydrogen production.

Generally, a SMR may be used as a standalone unit, separate from a fuel cell system. Typically, these reformers generate NOx during the reforming reaction, which limits their installation alongside fuel cell systems due to regulations controlling the amount of NOx that may be output from a system. Further, the standalone SMR requires heat for operation and the SMR typically requires a dedicated heat source to ensure sufficient heat is supplied for the reforming process.

A need exists for improved technology, including a system and method with improved efficiency and cost by integrating a SMR with a high-temperature fuel cell as described in this application. The integration also improves the efficiency of the fuel cell and reduces and/or eliminates NOx emissions.

SUMMARY

One embodiment relates to a steam methane reformer-integrated fuel cell system including at least one fuel cell having an anode, a cathode, and an electrolyte matrix separating the anode and the cathode. The system further includes a steam methane reformer configured to react methane with steam to produce a first product stream including hydrogen ($H_2$), carbon dioxide ($CO_2$), and carbon monoxide (CO).

One aspect of the system relates to the first product stream including a first concentration of hydrogen, and the system further including a water-gas shift reactor configured to react CO in the first product stream with steam to produce an outlet stream having a second concentration of hydrogen which is greater than the first concentration of hydrogen.

Another aspect of the system relates to an absorber column configured to reduce a concentration of $CO_2$ in the outlet stream such that a second product stream of the absorber column has a third concentration of hydrogen which is greater than the second concentration of hydrogen.

Another aspect of the system relates to a pressure swing adsorption (PSA) system configured to purify the second product stream such that a third product stream of the PSA purification system has a fourth concentration of hydrogen which is greater than the third concentration of hydrogen.

Another aspect of the system relates to fourth concentration of hydrogen being at least 95 mole %.

Another aspect of the system relates to the third concentration of hydrogen being at least 90 mole %.

Another aspect of the system relates to the second concentration of hydrogen being at least 70 mole %.

Another aspect of the system relates to at least one fuel cell being configured to receive a PSA tail gas from the PSA purification system as an anode feed gas.

Another aspect of the system relates to a stripper column connected to the absorber column. The stripper column is configured to receive a PSA tail gas from the PSA purification system and a solvent from the absorber column, and the stripper column is configured to strip $CO_2$ from the solvent using the PSA tail gas and output a $CO_2$-stripped solvent.

Another aspect of the system relates to the absorber column being configured to receive the $CO_2$-stripped solvent from the stripper column, such that the hydrogen concentration of the second product stream increases from the second concentration to the third concentration.

Another aspect of the system relates to an anode gas oxidizer (AGO) configured to receive anode exhaust gas from the fuel cell and a preheated air stream such that the anode exhaust gas reacts with the preheated air stream to produce a high-temperature exhaust stream.

Another aspect of the system relates to a flash gas apparatus configured to receive rich solvent from an absorber column and configured to produce a first $CO_2$-rich flashed gas stream comprising at least 60 mole % $CO_2$.

Another aspect of the system relates to the first $CO_2$-rich flashed gas stream being produced by a low-pressure flash system.

Another aspect of the system relates to a two-pressure flash system configured to produce the first $CO_2$-rich flashed gas stream, the two-pressure flash system having a medium-pressure flash apparatus, and a low-pressure flash apparatus. The medium-pressure flash apparatus is configured to operate at a pressure in a range of 40% to 60% of a pressure in the absorber column.

Another aspect of the system relates to the at least one $CO_2$-rich flashed gas stream being mixed with the anode exhaust gas from the at least one fuel cell and is sent to the AGO to increase the heat produced.

Another aspect of the system relates to the fourth concentration of hydrogen being at least 99 mole %.

Another aspect of the system relates to the fourth concentration of hydrogen being at least 99.99 mole %.

Another aspect of the system relates to the fuel cell system further including a pressure swing adsorption (PSA) purification system positioned downstream from the steam methane reformer and configured to produce a purified hydrogen stream having at least 95 mole % of hydrogen, and wherein a PSA tail gas of the PSA purification system is a fuel source for the at least one fuel cell.

In one aspect, the steam methane reformer is configured to receive the high temperature exhaust stream from the AGO to provide the heat needed for reforming.

The foregoing is a summary of the disclosure and thus by necessity contains simplifications, generalizations, and omissions of detail. Consequently, those skilled in the art will appreciate that the summary is illustrative only and is not intended to be in any way limiting. Other aspects, features, and advantages of the devices and/or processes described herein will become apparent in the detailed description set forth herein and taken in conjunction with the accompanying drawings.

DETAILED DESCRIPTION

Before turning to the figures, which illustrate the exemplary embodiments in detail, it should be understood that the claimed systems and methods are not limited to the details or methodology set forth in the description or illustrated in the figures.

The disclosure provided herein solves the above-referenced problems, increase the fuel cell and SMR efficiency while eliminating NOx output from the system, and reduce capital costs by integrating a steam methane reformer (SMR) with a high-temperature fuel cell (such as a molten carbonate fuel cell), such that the fuel cell system is modified to use lower-level waste heat to preheat air for the fuel-cell, thereby converting the fuel cell waste heat into high level heat that is used by the SMR.

Figure 1:
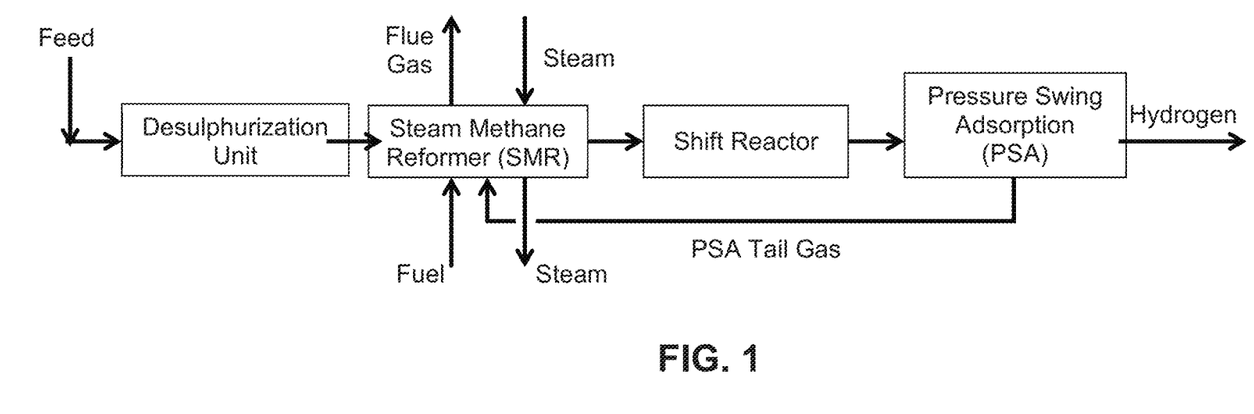
FIG. 1 illustrates a steam methane reforming process for pure hydrogen production.

Referring now to FIG. 1, a pure hydrogen production process is shown according to an exemplary embodiment. Specifically, the steam methane reforming process utilizes a desulfurization unit, a steam methane reformer (SMR), a shift reactor or reactors, and a pressure swing adsorption unit, as shown in FIG. 1. In a first step, a light hydrocarbon feed gas is desulfurized to prevent sulfur poisoning of catalysts used in the steam methane reformer and shift reactor. Next, a SMR operates to produce hydrogen from the methane feedstock. In steam methane reforming, methane reacts with steam in the presence of a catalyst to produce hydrogen, carbon monoxide, and carbon dioxide. Steam reforming is endothermic and requires heat to be supplied for the reaction to proceed (e.g., from the combustion of the feed gas itself, an external refinery feed gas, and/or PSA tail gas). In the configurations shown in FIGS. 2 and 3 below, heat for the reforming reaction in the SMR may be provided by a high-temperature fuel cell, such as from anode exhaust gas.

Referring still to FIG. 1, in a third step, the equilibrium for the reaction between methane and steam is further shifted toward the hydrogen product by conducting the water gas shift reaction, again in the presence of a catalyst, at lower temperatures than in the SMR. In a fourth step, hydrogen is separated from the product stream by pressure swing adsorption (PSA). The remaining PSA tail gas contains primarily CO, $CO_2$, $H_2$, and $CH_4$.

Figure 2:
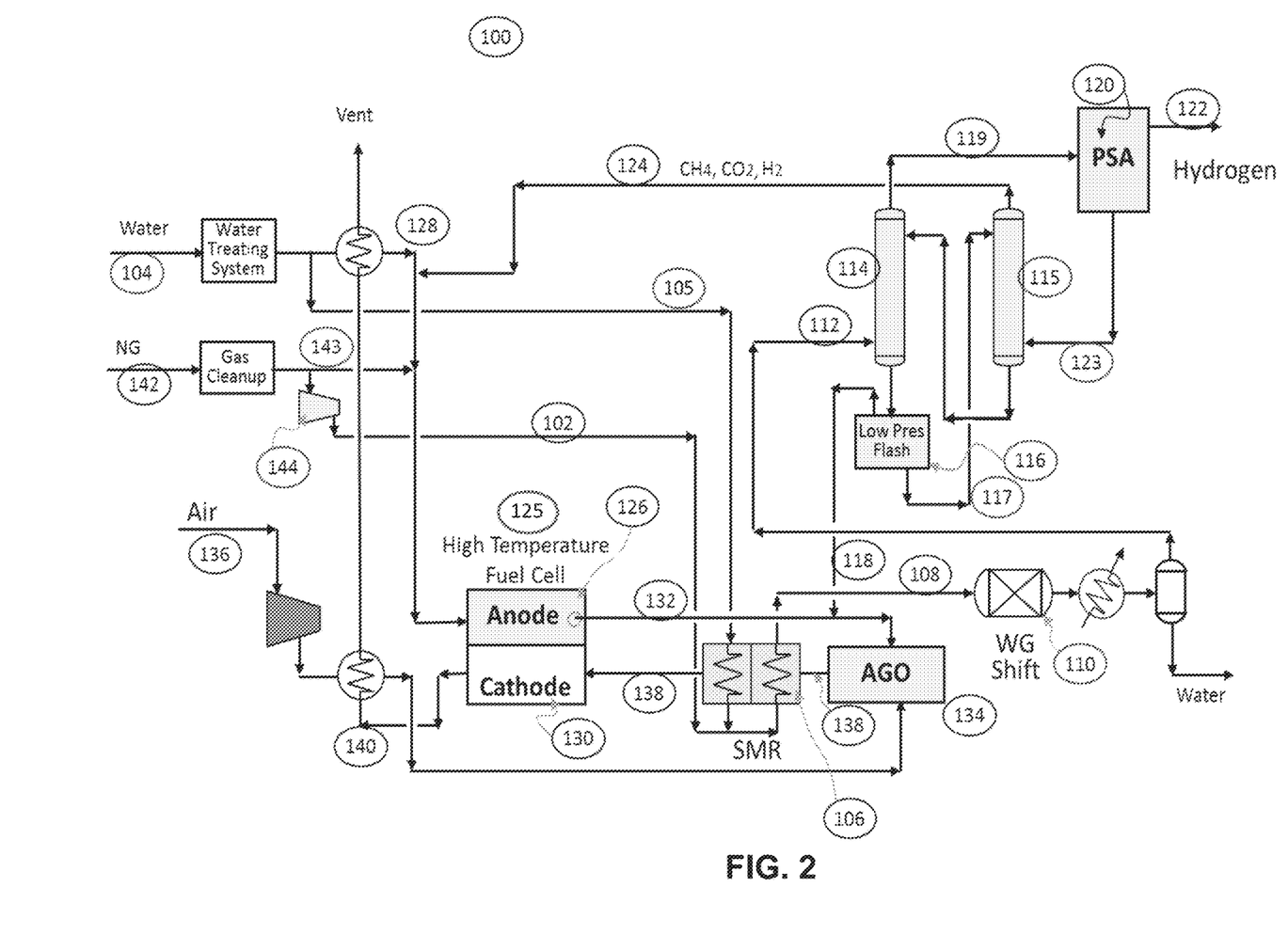
FIG. 2 illustrates a steam-methane reformer integrated high temperature fuel cell system according to one embodiment.

FIG. 2 illustrates a SMR-integrated high temperature fuel cell system 100 (i.e., a system) according to an exemplary embodiment for generating hydrogen without NOx utilizing a process similar to that shown in FIG. 1. The system 100 includes a fuel cell 125 having an anode 126, a cathode 130, and an electrolyte matrix disposed therebetween. The system 100 further includes a reformer 106, such as an SMR. An external feed gas stream 142 (e.g., methane and/or natural gas) and an external water stream 104 are provided to the system 100. The feed gas stream 142 may be divided into a first feed gas stream 143, which is configured to be fed to the anode 126 of the fuel cell 125, and a second feed gas stream 102, which is configured to be fed to the reformer 106. According to an exemplary embodiment, the feed gas stream 142 includes at least 90 mole % methane at a pressure of at least 250 psia. Similar to the feed gas stream 142, the water stream 104 is divided into a first water stream 128, which is configured to be fed to the anode 126, and a second water stream 105, which is configured to be fed to the reformer 106. According to an exemplary embodiment, the first water stream 128 may include steam and the second water stream 105 may include liquid water, although each of the first water stream 128 and the second water stream 105 may include one or both of liquid or vapor water (i.e., steam).

Within the reformer 106, steam from the second water stream 105 reacts with methane or other hydrocarbon fuel in the second feed gas stream 102 in the presence of a catalyst in order to produce hydrogen ($H_2$), along with carbon monoxide (CO) and carbon dioxide ($CO_2$). In a side reaction, a water-gas shift reaction converts CO (e.g., produced in the steam reforming reaction) to $CO_2$, thereby producing additional $H_2$. It should be understood that steam reforming is endothermic reaction and heat must be supplied to the reformer 106 for the reaction to proceed according to reactions (1) and (2):

$$CH_4 + H_2O \leftrightarrow CO + 3H_2 \quad (1)$$

$$CO + H_2O \leftrightarrow CO_2 + H_2 \quad (2)$$

Both reactions are reversible with reaction (1) favored by a high-temperature and reaction (2) favored by lower temperatures.

After the reformer 106 reacts the second feed gas stream 102 and the second water stream 105, the reformer 106 outputs a product stream 108 (i.e., a first product stream), including $H_2$, CO, and $CO_2$, and having a first hydrogen concentration, which is then cooled and undergoes a water-gas shifting reaction in a reactor 110 (i.e., a WGS reactor). In the reactor 110, CO and steam are further reacted as in reaction (2) above, using a catalyst, which does not enable reforming the product stream 108 to produce $CO_2$ and more $H_2$. The reformer 110 then outputs a reformer outlet stream 112 (i.e., a stream, an absorber feed stream, etc.), which is cooled and condensed to remove water from the reformer outlet stream 112 and having a higher hydrogen concentration (i.e., a second concentration) than the product stream 108.

The reformer outlet stream 112 is fed to an absorber column 114 having a composition including primarily $H_2$ and $CO_2$ and a residual of mostly unconverted CO and unreacted methane. In one implementation, the reformer outlet stream 112 includes at least 70 mole % $H_2$ and at least 15 mole % $CO_2$. The absorber column 114 is configured to remove a bulk amount of $CO_2$ contained in the reformer outlet stream 112. In one example, a solvent in the absorber column 114 absorbs (e.g., dissolves) the $CO_2$ in the reformer outlet stream 112 at a relatively high pressure (e.g., approximately 300 psia). The solvent (i.e., rich solvent) containing the $CO_2$ of the reformer outlet stream 112 is reduced in pressure using a low-pressure flash system 116 to release and recover most of the $CO_2$ of the reformer outlet stream 112. According to another exemplary embodiment, the system 100 includes an anode gas oxidizer (AGO) 134 having a low pressure and the absorber column 114 operates at substantially the same low pressure as the AGO 134. In the configurations shown in FIGS. 2 and 3, the separation process in the absorber column to separate $CO_2$ from the reformer outlet stream 112 operates selectively to recover $CO_2$ and output a recovered $CO_2$-rich stream 118 (e.g., at least approximately 60 mole % $CO_2$) to the AGO 134 with a small amount of fuel ($H_2$, $CH_4$, CO). In one implementation, the solvent may be mixtures of dimethyl ethers of polyethylene glycol. A physical solvent is preferred to maximize the case of solvent regeneration without the use of additional heat.

Figure 3:
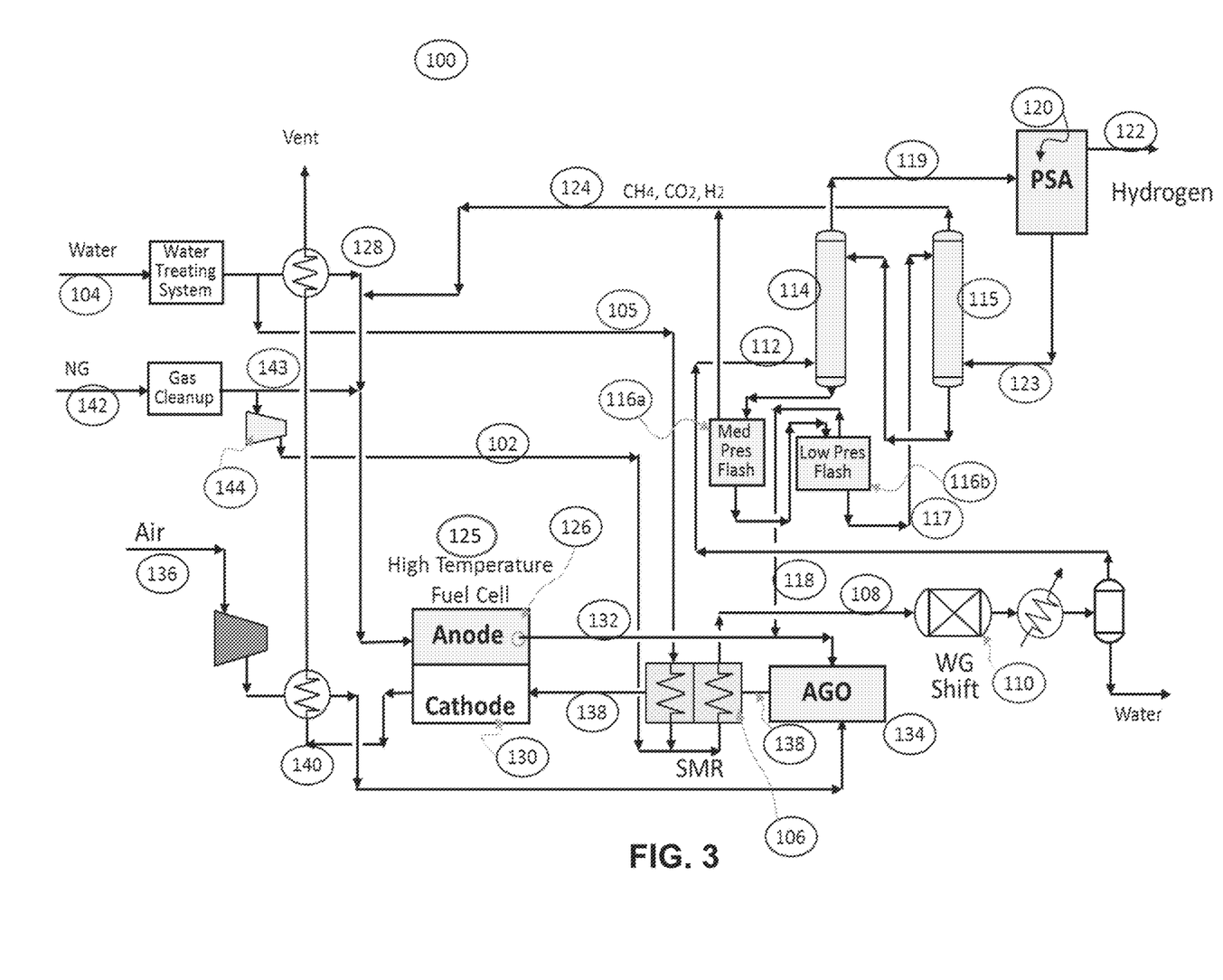
FIG. 3 illustrates a steam-methane reformer integrated high temperature fuel cell system according to one embodiment.

In some embodiments, such as in the system 100 as shown in FIG. 3, a two pressure flash system is used to remove most of the $CO_2$ from the rich solvent. Specifically, the system 100 includes a medium-pressure (i.e., first) flash 116a and a low-pressure (i.e., second) flash 116b. In the configuration shown in FIG. 3, the medium-pressure flash 116a may be operated at approximately between 40% to 60% of the pressure in the absorber column 114, with the resultant first stage flash gas containing mostly $H_2$. This first stage flash gas is then added as a gas recycle to the fuel cell 125 via a reformer off-gas stream 124 (i.e., a stream). In other words, the medium-pressure flash 116a produces a gas stream high in $H_2$ concentration and other fuel (e.g., CO, $CH_4$) which is recycled to the fuel cell via the reformer off-gas stream 124.

In order to minimize $CO_2$ in the solvent to the absorber column 114 and minimize $CO_2$ in a high-hydrogen concentration stream 119 (i.e., a second product stream, a PSA feed, etc.) output from the absorber column 114, partially-regenerated solvent from the low-pressure flash system 116a is sent via a stream 117 (i.e., a liquid effluent stream, a solvent stream, etc.) to a stripper column 115. The stripper column 115 pressure is lowered, such that the $CO_2$, now contained within the stream 117 from the low-pressure flash system 116 is further reduced due to the liquid effluent. A PSA tail gas 123, which is low in $CO_2$, is used to strip more $CO_2$ from the stream 117, such that an overhead gas of the stripper column 115, which contains mainly hydrogen, methane, and carbon dioxide (less than 40 mole %), is recycled back into the system 100 (e.g., to the fuel cell 125) as reformer off-gas stream 124. In other embodiments, the stripper column 115 may be excluded from the system 100, in which case stream 117, a lean solvent stream with low $CO_2$ from the low-pressure flash system 116, is sent to the absorber column 114 and the PSA tail gas 123 is recycled directly to the fuel cell 125 via the reformer off-gas stream 124.

Referring still to FIGS. 2 and 3, the high-hydrogen concentration stream 119 has a third hydrogen concentration (e.g., approximately 90 mole %), which is greater than the second hydrogen concentration and enters a pressure swing adsorption purification system 120 (i.e., a PSA system) after exiting the absorber column 114 and going through $CO_2$ removal. The high purity of the stream 119 as a PSA feed reduces the required size of the PSA system 120 and increases the hydrogen recovery from the PSA system 120. In one implementation, the high-hydrogen concentration stream 119 includes at least 90 mole % hydrogen and small amounts of $CO_2$, CO, $CH_4$, and $N_2$. It should be understood that in the PSA system 120, the PSA process is based on a physical binding of gas molecules to adsorbent material, with the binding force depending on the gas component, type of adsorbent material, partial pressure of the gas component and operating temperature. Separation, and ultimately purification of the feed gas, is based on differences in binding forces to the adsorbent material. Highly volatile components with low polarity, such as hydrogen, are weakly adsorbed, while molecules such as $CO_2$, CO, hydrocarbons, $N_2$, and water vapor have strong binding affinity to the adsorbent. Consequently, these impurities are adsorbed from a $H_2$-containing stream and high purity hydrogen is recovered. In one implementation, a product stream 122 (i.e., a third product stream, a PSA product stream, a PSA output stream, etc.) includes a fourth hydrogen concentration greater than the third hydrogen concentration. For example, the product stream 122 includes at least 95 mole % hydrogen. In another implementation, the product stream 122 includes at least 98 mole % hydrogen. In yet another implementation, the product stream 122 includes at least 99 mole % hydrogen. In yet another implementation, the product stream 122 includes at least 99.99 mole % hydrogen.

The PSA tail gas 123, including mostly $H_2$ and $CH_4$, with some CO and low levels of $CO_2$, is used to strip $CO_2$ from stream 117 in the stripper column 115 and is then fed to the fuel cell 125, which may be a high temperature fuel cell. In some embodiments, the fuel cell 125 may be a molten carbonate high temperature fuel cell (i.e., MCFC), which may be preferred since the higher $CO_2$ content of the reformer off-gas stream 124 may be used as fuel for the fuel cell 125 without any performance or economic penalties for this type of fuel cell.

As shown in FIGS. 2 and 3, a combined anode feed gas received by the anode 126 includes a mixture of the first feed gas stream 143, the first water stream 128, and the reformer off-gas stream 124 as a hydrocarbon fuel source. In this configuration, the presence of the reformer off-gas stream 124 reduces the amount of external methane required to be supplied by the first feed gas stream 143 by supplying a quantity of fuel (e.g., $H_2$, CO, methane), thereby increasing the fuel cell efficiency.

Referring to FIG. 2, operation of the high-temperature fuel cell 125 produces an anode exhaust gas 132 including mostly $CO_2$ (40 to 80 mole %), which is then fed to the AGO 134 either separate from or together with the $CO_2$-rich stream 118 from the reformer 106. Along with high-temperature anode exhaust gas 132 output from the high-temperature fuel cell 125, and flash-evaporated, $CO_2$-rich stream 118, a preheated air stream 136 is also fed to the AGO 134. Preheated air stream 136 is mixed and/or reacted with the anode exhaust gas 132 and the $CO_2$-rich stream 118 in the AGO 134 to further heat the air stream 136. By preheating the air stream 136, the temperature of the AGO 134 operates at a much higher level than in a typical operation (e.g., over 1700° F.). At this temperature level, an exhaust stream 138 (i.e., an AGO exhaust stream) exiting the AGO 134 may be used to provide heat to the reformer 106 before entering the cathode 130 of the high-temperature fuel cell 125. Notably, because both the preheated air stream 136 and the anode exhaust gas 132 are heated to a very high level due to the operating temperature of the high-temperature fuel cell 125, the AGO 134 outputs an exhaust stream 138 to the reformer 106 at a much higher temperature than in other AGO configurations.

It should be appreciated that, this high-temperature inputs to the reformer 106 either limits or prevents the formation of NOx from the reformer 106 due to the high-temperature operation of the reformer 106 and therefore prevents the output of NOx from the system 100, unlike in conventional standalone SMRs. In this configuration, heat is supplied to the reformer 106 by air stream 136 and the fuel value of both the anode exhaust gas 132 and the flash-evaporated, $CO_2$-rich stream 118, the latter two of which are burned in the air stream 136 in AGO 134. In one embodiment, a molten carbonate fuel cell is used as the high temperature fuel cell and the increased $CO_2$ from the SMR improves the voltage performance of the fuel cell.

The cathode 130 produces a cathode exhaust gas 140, which is vented from the system 100 after heat is recovered to preheat the air stream 136, the water stream 104, and the feed gas stream 142 provided to the fuel cell 125. It should be appreciated that low-level heat from the fuel cell 125 is recovered and transferred to the air stream 136 and that other low-level heat from the fuel cell 125 or other portions of the system 100 may be further used to preheat the air stream 136 as if the air stream 136 were heated by a single high-level heat source.

According to another exemplary embodiment, the hydrogen production process of the system 100 may be used to co-produce $CO_2$. For example, the product stream 122 output from the PSA system 122 may include $CO_2$ along with $H_2$, discussed above. In this configuration, the rich solvent from the absorber column 114 is heated to generate a higher pressure $CO_2$-rich stream, such as the stream 117, which is then fed to the stripper column 115. According to another exemplary embodiment, the system 100 may operate with the absorber feed stream 112 (i.e., a stream, a PSA feed stream, a reformer outlet gas stream, etc.) bypassing the absorber column 114. In this configuration, the stream 112 output from the reactor 110 is fed directly to the PSA system 120. According to yet another exemplary embodiment, the stream 112 may bypass the absorber column 114 and be fed to the PSA system 120 via one or more of the stripper column 115, medium-pressure flash 116a, and/or the low-pressure flash 116b, 116. The PSA system 120 may then be configured to remove impurities and produce a purified hydrogen product stream 122 and a PSA tail gas 123, which is high in $CO_2$ and may be recycled directly to one or both of the fuel cell 125 and/or the AGO 134.

As shown in FIGS. 2 and 3, the system 100 may further include a compressor 144 (i.e., a reformer natural gas compressor), which is configured to receive and compress the second feed gas stream 102 to increase the pressure of the second feed gas stream 102 before feeding the second feed gas stream 102 to the reformer 106. According to other exemplary embodiments, the external feed gas stream 142 is provided at a high pressure (e.g., at or near the operating pressure of the reformer 106), such that the second feed gas stream 102 may be fed directly to the reformer 106 without first being compressed.

According to various exemplary embodiments, water from the water feed stream 104 may be heated before being fed to the fuel cell 125 or the reformer 106. For example, FIGS. 2 and 3 show heat being transferred in a heat exchanger from the cathode exhaust gas 140 to the first water stream 128 before feeding the first water stream 128 to the anode 126. It should be appreciated that according to other exemplary embodiments, heat may additionally or alternatively be transferred from the cathode exhaust gas 140 to the second water stream 105 before feeding the second water stream 105 to the reformer 106. According to other exemplary embodiments, the water feed stream 104 and portions thereof may be preheated using waste heat from other portions of the system 100.

According to other exemplary embodiments, in locations where water availability is limited, the anode exhaust gas 132 may be cooled (e.g., via one or more heat exchangers) and the water condensed (e.g., via one or more condensers, flash gas apparatuses, knockout pots, flash drums, or the like) from the anode exhaust gas 132 prior to oxidizing the anode exhaust gas 132 in the AGO 134. Condensate water from the process of cooling the anode exhaust gas 132 along with water condensed from the absorber feed stream 112 may replace substantially all or most of the water from the external water stream 104. Benefits of this configuration include hydrogen and power production with minimal water input from external supplies (e.g., during start-up of the system 100), since sufficient amounts of water may be produced internally by the high temperature fuel cell 125.

The fuel cell system 100 presented herein integrates a steam methane reformer 106 together with a high temperature fuel cell 125. It should be appreciated that this configuration has many advantages when compared to conventional systems, which have fuel cells and steam methane reformers operating independently of one another. For example, these advantages may include outputting little or no NOx emissions; a higher operational efficiency, lower operating or manufacturing cost, smaller PSA system 120 with higher hydrogen recovery due to the PSA feed being more concentrated in hydrogen (approximately 90% $H_2$); a high-value PSA tail gas for operating as a fuel cell fuel, thereby reducing overall natural gas consumption for the fuel cell; and a hydrogen pressure generated at approximately 300 psig, among other advantages. Further, a smaller amount of power is needed to compress a natural gas feed to the steam methane reformer 106 than is needed to compress the absorber feed stream 112, and therefore the reformer 106 is operated at pressure.

The presently disclosed system 100 produces a high-value for the fuel cell waste heat, increasing the electrical efficiency to at least 60%. It should further be appreciated that if not all fuel cell waste heat is required for hydrogen production, a portion may be used to generate high pressure steam for export from the system 100. Moreover, the amount of hydrogen produced per kilowatt-hour of power produced is greater than conventional hydrogen co-generation fuel cell configurations. Accordingly, the integration of the steam methane reformer 106 into the system 100 results in hydrogen and power being produced at higher efficiency and lower cost than would be feasible otherwise.

Since there is no flue gas from the SMR, the integrated fuel cell/SMR system disclosed herein eliminates NOx emissions from steam methane reformers (and NOx from the fuel cell remains extremely low), increases system efficiency for the steam methane reformer and fuel cell, and reduces cost. For example, the presently disclosed fuel cell-steam methane reformer integrated system has improved efficiency with minimal impact on the standard fuel cell system and co-produces hydrogen with substantially lower parasitic power loads.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present application. For example, the heat recovery heat exchangers may be further optimized.

What is claimed is:

1. A steam methane reformer-integrated fuel cell system, comprising:
    at least one fuel cell comprising:
        an anode;
        a cathode; and
        an electrolyte matrix separating the anode and the cathode;
    a steam methane reformer configured to react methane with steam to produce a first product stream including a first concentration of hydrogen ($H_2$), carbon dioxide ($CO_2$), and carbon monoxide (CO);
    a water-gas shift reactor configured to react CO in the first product stream with steam to produce an outlet stream having a second concentration of hydrogen that is greater than the first concentration of hydrogen;
    an absorber column configured to reduce a concentration of $CO_2$ in the outlet stream such that a second product stream of the absorber column has a third concentration of hydrogen that is greater than the second concentration of hydrogen;
    a pressure swing adsorption (PSA) system configured to purify the second product stream to output (1) a third product stream of the PSA system having a fourth concentration of hydrogen that is greater than the third concentration of hydrogen and (2) a PSA tail gas; and
    an anode gas oxidizer (AGO) configured to output a high-temperature exhaust stream,
    wherein the at least one fuel cell is configured to receive the PSA tail gas from the PSA system as an anode feed gas, and
    wherein the steam methane reformer is configured such that the steam and methane in the steam methane reformer are heated by the high-temperature exhaust stream.

2. The system of claim 1, further comprising a flash gas apparatus configured to receive solvent comprising $CO_2$ from the absorber column and to produce a first $CO_2$-rich flashed gas stream.

3. The system of claim 1, further comprising a flash gas apparatus configured to receive solvent comprising $CO_2$ from the absorber column and to produce a first $CO_2$-rich flashed gas stream comprising at least 60 mole % $CO_2$.

4. The system of claim 1, wherein the second concentration of hydrogen is at least 70 mole %.

5. The system of claim 1, wherein the third concentration of hydrogen is at least 90 mole %.

6. The system of claim 1, wherein the fourth concentration of hydrogen is at least 95 mole %.

7. The system of claim 1, wherein:
    the AGO is configured to receive anode exhaust gas from the at least one fuel cell and a preheated air stream such that the anode exhaust gas reacts with the preheated air stream to produce the high-temperature exhaust stream.

8. The system of claim 7, wherein the AGO is configured to provide the high-temperature exhaust stream to the cathode of the at least one fuel cell.

9. The system of claim 8, wherein the steam methane reformer is configured to utilize heat from the high-temperature exhaust stream output from the AGO before the high-temperature exhaust stream is provided to the cathode of the at least one fuel cell.

10. The system of claim 7, wherein the AGO is configured to receive the PSA tail gas.

11. The system of claim 7, wherein the AGO is configured to receive a $CO_2$-rich stream from the steam methane reformer.

12. The system of claim 7, wherein the cathode is configured to output a cathode exhaust gas, the cathode exhaust gas configured to heat an air stream to form the preheated air stream.

13. The system of claim 1, wherein the PSA tail gas comprises $H_2$ and $CH_4$.

14. The system of claim 1, wherein the PSA tail gas comprises CO, $CO_2$, $H_2$, and $CH_4$.

15. The system of claim 1, further comprising a medium-pressure flash gas apparatus configured to receive solvent comprising $CO_2$ from the absorber column and operate at a pressure in a range of 40% to 60% of a pressure in the absorber column.

16. The system of claim 1, wherein the PSA tail gas is recycled directly to the at least one fuel cell via a reformer off-gas stream.

17. The system of claim 1, wherein the at least one fuel cell is configured to receive a water stream and a feed gas stream.

18. The system of claim 17, wherein the cathode is configured to output a cathode exhaust gas, the cathode exhaust gas configured to heat the water stream and the feed gas stream.

19. The system of claim 1, further comprising:
    a flash gas apparatus configured to receive solvent comprising $CO_2$ from the absorber column and to produce a first $CO_2$-rich flashed gas stream,
    wherein the AGO is configured to receive a mixture of anode exhaust gas from the at least one fuel cell, a preheated air stream, and the first $CO_2$-rich flashed gas stream, such that the anode exhaust gas reacts with the preheated air stream to produce a high-temperature exhaust stream.

20. A steam methane reformer-integrated fuel cell system, comprising:
    at least one fuel cell comprising:
        an anode;
        a cathode; and an electrolyte matrix separating the anode and the cathode;
a steam methane reformer configured to react methane with steam to produce a first product stream including a first concentration of hydrogen ($H_2$), carbon dioxide ($CO_2$), and carbon monoxide (CO);
a water-gas shift reactor configured to react CO in the first product stream with steam to produce an outlet stream having a second concentration of hydrogen that is greater than the first concentration of hydrogen;
an absorber column configured to reduce a concentration of $CO_2$ in the outlet stream such that a second product stream of the absorber column has a third concentration of hydrogen that is greater than the second concentration of hydrogen;
a pressure swing adsorption (PSA) system configured to purify the second product stream to output (1) a third product stream of the PSA system having a fourth concentration of hydrogen that is greater than the third concentration of hydrogen and (2) a PSA tail gas;
a flash gas apparatus configured to receive solvent comprising $CO_2$ from the absorber column and to produce a first $CO_2$-rich flashed gas stream; and
an AGO configured to receive a mixture of anode exhaust gas from the at least one fuel cell, a preheated air stream, and the first $CO_2$-rich flashed gas stream, such that the anode exhaust gas reacts with the preheated air stream to produce a high-temperature exhaust stream,
wherein the at least one fuel cell is configured to receive the PSA tail gas from the PSA system as an anode feed gas.

* * * * *